United States Patent
Allen et al.

(10) Patent No.: US 9,654,517 B2
(45) Date of Patent: *May 16, 2017

(54) CONNECTION MODEL-BASED CONTROL OF CONCURRENT CONNECTION COUNT AND PROPERTIES

(71) Applicant: International Business Machines Corporation, Armonk, NY (US)

(72) Inventors: Gerald M. W. Allen, Eastleigh (GB); Michael D. Brooks, Southampton (GB); Philip I. Wakelin, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 14/057,549

(22) Filed: Oct. 18, 2013

(65) Prior Publication Data

US 2014/0164631 A1 Jun. 12, 2014

Related U.S. Application Data

(63) Continuation of application No. 13/706,919, filed on Dec. 6, 2012, now Pat. No. 9,300,697.

(51) Int. Cl.
*G06F 15/16* (2006.01)
*H04L 29/06* (2006.01)
*H04L 29/08* (2006.01)

(52) U.S. Cl.
CPC ........ *H04L 65/1069* (2013.01); *H04L 63/101* (2013.01); *H04L 67/1023* (2013.01)

(58) Field of Classification Search
CPC  H04L 65/1069; H04L 63/101; H04L 67/1023
(Continued)

(56) References Cited

U.S. PATENT DOCUMENTS 7,493,628 B2   2/2009   Potter et al.
7,644,137 B2   1/2010   Bozak et al.
(Continued)

OTHER PUBLICATIONS

Author Unknown, Autoinstallation of IPIC connections, Webpage/site: CICS Transaction Server for z/OS, Version 3.2, May 25, 2012, pp. 1-2, IBM Corporation, Published online at: http://publib.boulder.ibm.com/infocenter/cicsts/v3r2/index.jsp?topic=%2Fcom.ibm.cics.ts.doc%2FIpaths%2Fipic_Ip_autoinstall.html.
(Continued)

*Primary Examiner* — Ario Etienne
*Assistant Examiner* — Sahera Halim
(74) *Attorney, Agent, or Firm* — Lee Law, PLLC; Christopher B. Lee (57) ABSTRACT

A connection request including a connection model key and a partner system attribute of the partner system requesting a connection is received at an application server from a partner system. Using a predefined connection model, as determination is made as to whether the received connection model key and the received partner system attribute respectively match a configured connection model key and a configured authorized partner system attribute within the predefined connection model. In response to determining that the received connection model key and the received partner system attribute match the respective configured connection model key and the configured authorized partner system attribute within the predefined connection model, a connection is created that includes a first unique connection name derived from the received partner system attribute.

18 Claims, 5 Drawing Sheets

(58) Field of Classification Search
USPC .................................................. 709/227, 228
See application file for complete search history.

(56) References Cited

U.S. PATENT DOCUMENTS 7,664,818 B2 * 2/2010 Wolber .................. G06F 9/465
  709/206
2011/0320574 A1 12/2011 Felts

OTHER PUBLICATIONS

Author Unknown, Configuring CICS connection autoinstall, Webpage/site: CICS Transaction Gateway for Multiplatforms V8.0, Feb. 23, 2012, p. 1, IBM Corporation, Published online at: http://publib.boulder.ibm.com/infocenter/cicstgmp/v8r0/index.jsp?topic=%2Fcom.ibm.cics.tg.doc%2Fctgwin%2Fcclaacom.ide15.html.

Author Unknown, Configuring Advanced JMS System Resources, Webpage/site: Oracle® Fusion Middleware Configuring and Managing JMS for Oracle WebLogic Server 12c Release 1 (12.1.1), Printed from website on Jan. 30, 2012, pp. 1-23, Oracle Corporation, Published online at: http://docs.oracle.com/cd/E24329_01/web.1211/e24385/advance_config.htm#i105663.

Phil Wakelin, et al., Integrating WebSphere Application Server and CICS using CICS Transaction Gateway, White Paper, Mar. 2008, pp. 1-28, IBM Corporation, Published online at: ftp://ftp.software.ibm.com/software/htp/cics/pdf/WSW14013-USEN-00.pdf.

Author Unknown, Autoinstalling IPIC connections; preliminary considerations, Webpage/site: CICS Transaction Server for z/OS, Version 4.2, Nov. 19, 2012, pp. 1-3, IBM Corporation, Published online at: http://pic.dhe.ibm.com/infocenter/cicsts/v4r2/topic/com.ibm.cics.ts.doc/dfha3/topics/dfha3ip2.html.

United States Patent and Trademark Office, Notice of Allowance for U.S. Appl. No. 13/706,919 Dec. 22, 2015, pp. 1-5, Alexandria, VA, USA.

United States Patent and Trademark Office, Office Action for U.S. Appl. No. 13/706,919, Apr. 10, 2015, pp. 1-11, Alexandria, VA, USA.

United States Patent and Trademark Office, Office Action for U.S. Appl. No. 13/706,919, Sep. 24, 2015, pp. 1-11, Alexandria, VA, USA.

* cited by examiner

CONNECTION MODEL-BASED CONTROL OF CONCURRENT CONNECTION COUNT AND PROPERTIES

RELATED APPLICATIONS

This application is a continuation of, claims priority to, and claims the benefit of U.S. patent application Ser. No. 13/706,919, titled "CONNECTION MODEL-BASED CONTROL OF CONCURRENT CONNECTION COUNT AND PROPERTIES," which was filed in the U.S. Patent and Trademark Office on Dec. 6, 2012, and which is incorporated herein by reference in its entirety.

BACKGROUND

The present invention relates to server connections. More particularly, the present invention relates to connection model-based control of concurrent connection count and properties.

Application servers provide applications that may be executed on behalf of remote requesting systems. A requesting system may request execution of a program that resides on an application server. Results of the execution of the application resident on the application server may be returned to the requesting system.

BRIEF SUMMARY

A method includes receiving, at an application server from a partner system, a connection request comprising a connection model key and a partner system attribute of the partner system requesting a connection; determining, using a predefined connection model, whether the received connection model key and the received partner system attribute respectively match a configured connection model key and a configured authorized partner system attribute within the predefined connection model; and creating, in response to determining that the received connection model key and the received partner system attribute match the respective configured connection model key and the configured authorized partner system attribute within the predefined connection model, a connection that comprises a first unique connection name derived from the received partner system attribute.

A system includes a memory and a processor programmed to execute an application server to: receive, from a partner system, a connection request comprising a connection model key and a partner system attribute of the partner system requesting a connection; determine, using a predefined connection model stored within the memory, whether the received connection model key and the received partner system attribute respectively match a configured connection model key and a configured authorized partner system attribute within the predefined connection model; and create, in response to determining that the received connection model key and the received partner system attribute match the respective configured connection model key and the configured authorized partner system attribute within the predefined connection model, a connection that comprises a first unique connection name derived from the received partner system attribute.

A computer program product includes a computer readable storage medium having computer readable program code embodied therewith, where the computer readable program code when executed on a computer causes the computer to execute an application server to: receive, from a partner system, a connection request comprising a connection model key and a partner system attribute of the partner system requesting a connection; determine, using a predefined connection model, whether the received connection model key and the received partner system attribute respectively match a configured connection model key and a configured authorized partner system attribute within the predefined connection model; and create, in response to determining that the received connection model key and the received partner system attribute match the respective configured connection model key and the configured authorized partner system attribute within the predefined connection model, a connection that comprises a first unique connection name derived from the received partner system attribute.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides connection model-based control of concurrent connection count and properties. The present technology allows a specific set/cluster of partner systems to connect to a server using the same connection model defined at the server, while non-authorized/non-configured partner systems may be denied connectivity. A single configuration of a connection is specified in the connection model along with a connection model key that identifies the connection model and a predefined system attribute (e.g., partner system application identifier, or other identifier) that identifies authorized partner system instances that may connect using the connection model. To connect to the server, the partner system instances pass the model key and their respective predefined system attribute. In response to a match of the model key and predefined system attribute, a connection is created/established for the requesting partner system. A single connection is multiplexed on the server side among multiple partner systems that share the same predefined system attribute to appear as multiple connections. As such, partner system clones may connect using the same shared partner system identification details. Additionally, the multiplexed connection alleviates server-side restrictions that would otherwise result from multiple separate connections. Multiplexed connection limitations for partner systems may be enforced, for example, using connection namespace limitations for granted/established multiplexed connections within the connection model. Accordingly, the present technology facilitates access control and promotes resource utilization efficiency.

For example, the predefinition of connections within the connection model facilitates control of which systems may connect to each other. Additionally, the predefinition of connections within the connection model facilitates control of specific attributes of the connections, such as the security checking to be performed and protocols to be used, the communication protocols supported, and the maximum number of communication sessions that may be created. The connection model further facilitates limiting the number of clone partner systems with shared identification details that may be connected at the same time to the same server. Namespace field width or other namespace limitations for connection names within the connection model may be utilized to control the number of connections for instances of any given partner system to an application server, thereby defining an autonomously-enforceable connection control and limitation for specific partner systems.

As introduced above, when a connection request is received at a server from a partner system within a cluster, the model key received in the request may be compared to available connection models to identify a matching connection model. In response to a connection model match using the connection model key, the partner system identification details may be compared to the authorized partner identification details within the matching connection model. If the partner system identification details match those defined in the connection model, the connection is accepted and a unique connection name may be generated based on the partner application identifier. The connection may be generated autonomously based upon the defined security mechanism. If the partner system identification details do not match those defined in the connection model, the connection may be denied.

As such, an auto-install mechanism may be used to generate unique connection names, while enforcing the defined security mechanism to check the partner system's identification details prior to allowing connectivity. Additionally, different templates may be created for many different partner clusters that connect to the same server. Further, each auto-installed connection may be tracked back to the originating cluster because the connection name that is generated will be based on the partner application identifier.

As also introduced above, the maximum number of partner systems in the cluster that may connect to the server may, for example, be limited using naming conventions within the connection model. To utilize naming convention-based connection limitations, the connection names may be limited to a fixed size (e.g., character length) such that a number of available characters in the template name field may be used to control the number of clients that may connect.

The partner system attributes may be defined within the connection model to allow verification of authenticity of partner systems that request connectivity to an application server. The partner system attributes may be any attributes appropriate for a given implementation. For example, partner system attributes may include predefined system attributes, such as a partner system cluster application instance identifier, Internet protocol (IP) address(es), systems network architecture logical unit (SNA LU) names or customer information control system (CICS®) application identifiers (IDs), security implemented by the partner system, or other identifiers may be used to confirm authenticity of systems that originate connection requests. As such, a variety of possibilities exist for verification of partner system attributes and all such possibilities are considered to be within the scope of the present technology.

The connection model key defined within the connection model may also be defined within each partner system cluster within a partner system connection request model or connection factory. The partner system attribute/identifier may also be defined within the partner system connection request model or connection factory. The connection model key defined within the partner system connection request model or connection factory may be used by the partner systems along with the configured partner system attribute/identifier to identify the connection model to be used for the requested connection. A different connection model key and partner system cluster identifier may be defined for each respective partner cluster within different connection models. As such, granular definition of multiplexed connectivity by different partner systems may be implemented using the respective connection models.

As part of the request to connect to a remote application server, each partner instance may pass the connection model key and their respective partner system attribute (e.g., partner system cluster application instance identifier) with its first message to the application server. In response to receipt of this first message, the application server may compare the received connection model key to connection model keys defined within the available connection models that are defined at the server. If the received connection model key matches the connection model key within a connection model, the application server may validate/confirm that the partner system attributes (also defined within the connection model) match those of the requesting partner system (e.g., partner application identifier, Internet protocol (IP) address, etc.). If the partner attributes defined in the connection model identified by the received connection model key match those of the requesting partner system, the server may create a unique connection name based on the application identifier of the partner cluster, again limited by the defined allowable maximum number of connections for the partner system cluster. Once the final allowed connection name is created, no more connections may be created for the particular partner system cluster given the defined namespace limitations within the respective connection model.

As described in more detail below, the connection name field width may be defined as appropriate for a given implementation to allow flexibility of connection count and autonomous connection limitation control across different partner system clusters. Accordingly, connection limitations may be imposed within the connection model as appropriate for each partner system cluster using connection name field width in combination with partner system identifier/naming conventions (e.g., identifier width) that are used as model keys in connection requests. These connection limitations may be autonomously implemented in response to connection requests, and any additional connection attempts beyond the configured limit may be rejected until one of the existing connections is closed and available for reuse. As such, provisioning and resource management may be improved by avoiding excessive resource provisioning and by avoiding resource overutilization, respectively.

For example, the present technology maintains an awareness of the connection namespace and whether or not a connection name is in use at any particular point in time. To initially grant or to reuse connection numbers/names, the present technology may iterate around a set of possible values for the connection number suffix and, as such, does not need to maintain any state information other than the prior numeric connection number last used. To name a connection that is to be granted (based upon validation of the request itself against the connection model as described above and in more detail below), the present technology iterates through the possible connection namespace as follows. Initially, a check may be performed to determine whether the count of the maximum available namespace has been exceeded. If the count of the maximum available namespace has been exceeded, then the connection request may be denied. If count of the maximum available namespace has not been exceeded, a/the previous connection number may be retrieved (e.g., from a cache, register, variable, or otherwise). The previous connection number may be incremented, or if at the numeric limit, the connection number may be reset to the first connection number (e.g., reset to one (1)). The processing may then concatenate the resulting connection number as a numeric character suffix onto the supplied partner application attribute (e.g., identifier) to generate the connection name. The new connection number may be stored (e.g., again within a cache, register, variable, or otherwise). The processing then confirms/validates that the resulting connection name is available. If the resulting connection name is not available, the processing may iterate as described above until an available connection name is identified/validated. When the first available connection name is identified, the new connection may be installed/granted using this derived name (e.g., partner application identifier concatenated with the numeric suffix). As such, the present technology does not require a list or other data structure to obtain reuse of connection names. However, it should be noted that the above sequence of steps may be altered and a pool or list of reusable connection names may be used without departure from the scope of the present technology.

The present technology may be implemented, for example, as a middleware application within an application server system. The application server system may receive requests from remote applications using predefined/configured connections represented within the connection model. These predefined connections are used to control the ability of the application server to accept connections from other partner systems that request the execution of programs that reside on the application server system.

It should be noted that the present technology is applicable to a variety of interconnection environments. As such, within the description and examples herein, the term "partner system" is used to refer generally to a system or server that may be operative within a cluster of such systems or servers to connect to an application server as described herein. Additionally, a partner system may include an application level instance of either a server or a client application with respect to the application server/instance that manages connections that are requested by the partner systems as described herein. Further, more than one partner system instance may be instantiated on any given computing device and a cluster of such partner system instances may exist on one or more physical computing devices. Accordingly, the terms "partner system," "partner server," "client system," "client server," and partner or client "clones" may be interchanged within the description herein as appropriate for a given implementation.

The term "connect" or "connection" as used herein refers to a messaging/processing connection between an instance (e.g., instantiated application level process) of a partner system to a given application server. As such, the present technology extends to both partner server/system and client application instance connectivity to any given application server.

Additionally, the terms "connection model," "predefined model connection template," and similar terms are also considered synonyms and interchangeable herein. The connection model as described herein represents a template for connection creation that is used by a server to self-regulate the creation of new shared connections (e.g., shared logical connections operative over a single physical connection) that are requested by partner system instances. As such, the connection model represents a single configuration of a connection in a cell-like environment that is multiplexed on the server side to appear as multiple connections to partner system instance clones that attempt to connect to the server, thus limiting the effect of server-side connection restrictions. The connection model includes connection characteristics, such as the identification details of the partner system(s) that are authorized to connect to the server and any other specific connection attributes (e.g., protocol, security, connection number limitations, etc.) that are to be used for establishing connections. The server may utilize the connection model to verify/authenticate connection requests and to establish the actual connections that are requested within the configured connection limits. As such, the connection model operates as a flexible tool for server to self-regulate which client instances may connect to the server and to self-regulate the maximum number of authorized connections to the server for any given client instance cluster.

It should be noted that conception of the present subject matter resulted from recognition of certain limitations associated with connecting to application servers. For example, it was observed that within conventional application server environments, resource limitations, such as storage, connection, processor usage, and other resource limitations, result in creation of constraints within a given system environment. It was further observed that a cluster of clients (e.g., clones) may be forced by these constraints to use the same configuration for connecting with an application server instance to avoid resource over-provisioning. However, it was further observed that when an application server instance is created, a single partner system request model may be created and is used as a shared template by all clients/clones within the cluster that share the same application server instance. It was additionally observed that if multiple clients/clones share the same partner system request model, they utilize the same logical connection, which results in only one client/clone being able to connect to the application server instance at any given time. As a result of these observations, it was determined that it was desirable to create a connection architecture that allows multiple predefined logical connections between several clone instances and an application server instance that concurrently share the same physical connection. It was further determined that it was desirable to allow the clients/clones to dynamically connect to the application server instance. It was additionally determined that in conjunction with allowing dynamic connection to the application server instance, it was desirable to define which clients are allowed to connect to a given application server instance and to know with certainty the system from which the connection requests originated, while also being able to limit the number of connections that utilize the shared physical connection for resource management and control. The present subject matter improves application server instance connectivity by providing for connection model-based control of concurrent connection count and properties, as described above and in more detail below. As such, improved connection control may be obtained by use of the present technology.

The connection model-based control of concurrent connection count and properties described herein may be performed in real time to allow prompt connectivity of partner systems within different clusters to application servers using preconfigured connection models that specify individual cluster connectivity and connection limitations on a per-cluster basis. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
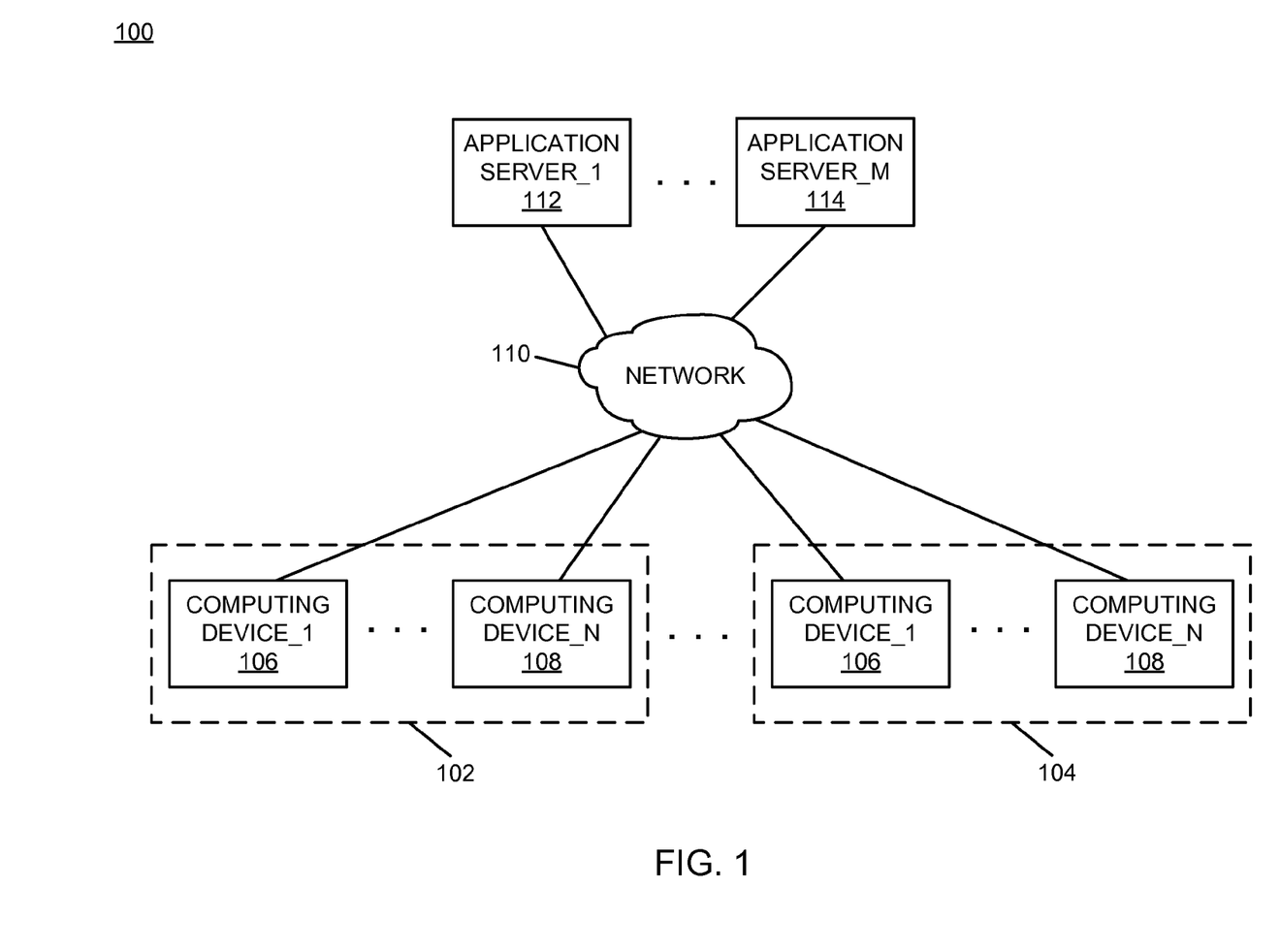
FIG. 1 is a block diagram of an example of an implementation of a system for connection model-based control of concurrent connection count and properties according to an embodiment of the present subject matter.

FIG. 1 is a block diagram of an example of an implementation of a system 100 for connection model-based control of concurrent connection count and properties. A computing cluster 102 through a computing cluster 104 represent a variable-sized set of partner computing system clusters. Each of the computing cluster 102 through the computing cluster 104 may include a variable number of computing devices, represented for ease of illustration as a computing device_1 106 through a computing device_N 108, though it is understood that the number of computing device may be different within each of the computing cluster 102 through the computing cluster 104. Each computing device 106 through 108 within the respective one of the computing cluster 102 through the computing cluster 104 may instantiate/execute one or more application client instances/clones that may each communicate via a network 110 to connect, as described above and in more detail below, with one or more of an application server_1 112 through an application server_M 114.

As will be described in more detail below in association with FIG. 2 through FIG. 5, the computing device_1 106 through the computing device_N 108 within each of the computing cluster 102 through 104, and the application server_1 112 through the application server_M 114 may cooperate to implement automated connection model-based control of concurrent connection count and properties. The automated connection model-based control of concurrent connection count and properties is based upon configuration and use of a predefined model connection template (e.g., connection model) that facilitates regulation, monitoring, and control of connection creation and connection limits between the respective application server(s) and computing device clusters. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 110 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
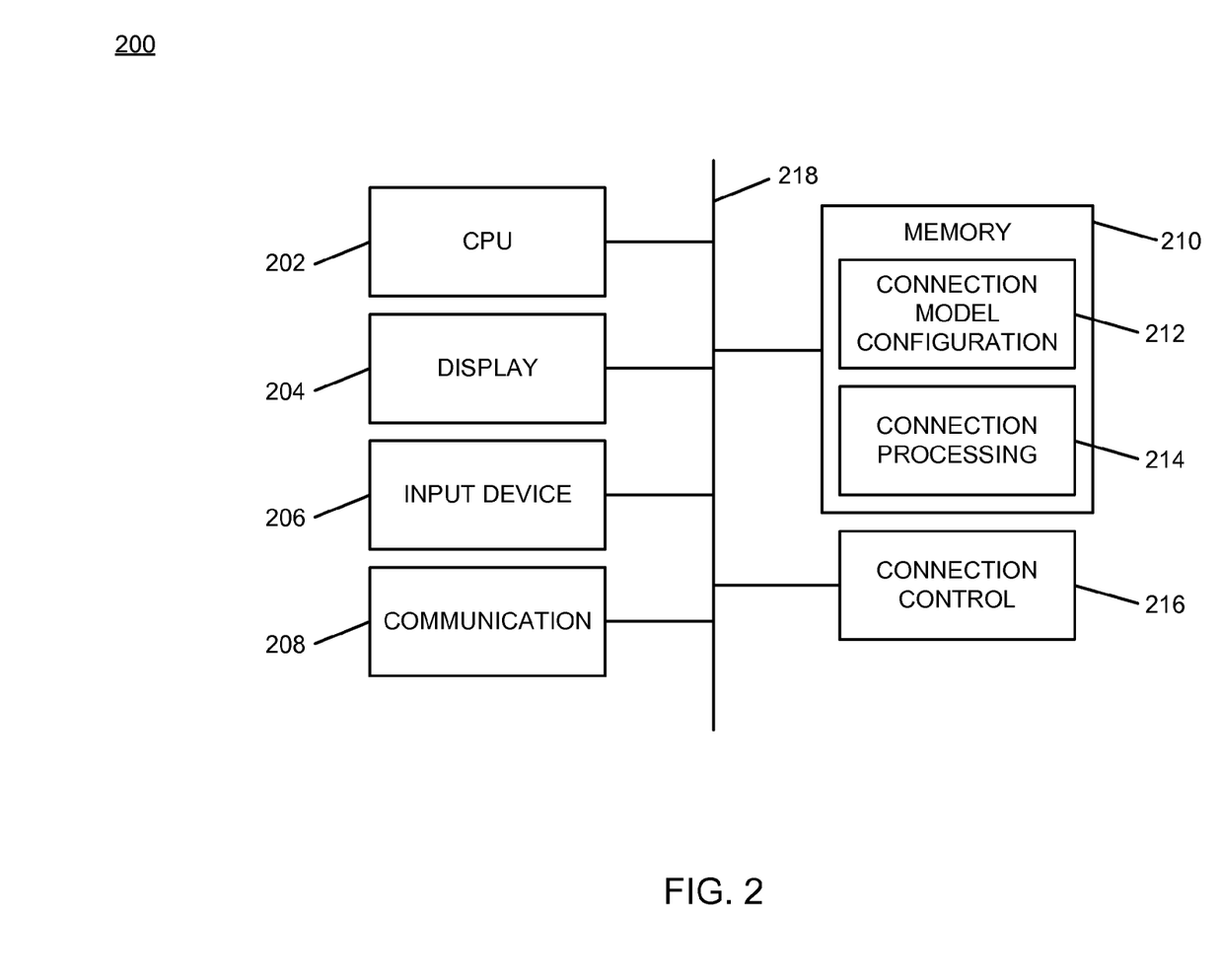
FIG. 2 is a block diagram of an example of an implementation of a core processing module capable of performing connection model-based control of concurrent connection count and properties according to an embodiment of the present subject matter.

FIG. 2 is a block diagram of an example of an implementation of a core processing module 200 capable of performing connection model-based control of concurrent connection count and properties. The core processing module 200 may be associated with any of the computing device_1 106 through the computing device_N 108 within each of the computing cluster 102 through 104, and with the application server_1 112 through the application server_M 114, with variations as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of connection model processing in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a connection model configuration area 212 that stores one or more connection models for use by the core processing module 200 when implemented in association with an application server, such as the application server_1 112 through the application server_M 114. The connection model configuration area 212 may alternatively store connection factories that include model keys and partner system identifiers as described above when implemented in association with a client/clone computing device, such as the computing device_1 106 through the computing device_N 108 within the computing cluster 102 through the computing cluster 104. The respective computing devices may utilize the connection factory information to request connections to the respective application server(s), and the application servers may utilize the connection model (e.g., connection template) information to authenticate/validate the connection requests, as described above and in more detail below.

The memory 210 also includes a connection processing area 214 that provides processing and storage space for use in requesting and/or granting/establishing/creating connections, as appropriate for the respective device. The connection processing area 214 also provides space for storing information associated with active connections (e.g., connection names, etc.). Additional information may be stored within the connection processing area 214 as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A connection control module 216 is also illustrated. The connection control module 216 provides connection creation and management processing for the core processing module 200, as described above and in more detail below. The connection control module 216 implements the automated connection model-based control of concurrent connection count and properties of the core processing module 200, again in a complementary manner as appropriate for the respective device within which the core processing module 200 is implemented.

It should also be noted that the connection control module 216 may form a portion of other circuitry described without departure from the scope of the present subject matter. Further, the connection control module 216 may alternatively be implemented as an application stored within the memory 210. In such an implementation, the connection control module 216 may include instructions executed by the CPU 202 for performing the functionality described herein. The CPU 202 may execute these instructions to provide the processing capabilities described above and in more detail below for the core processing module 200. The connection control module 216 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the connection control module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
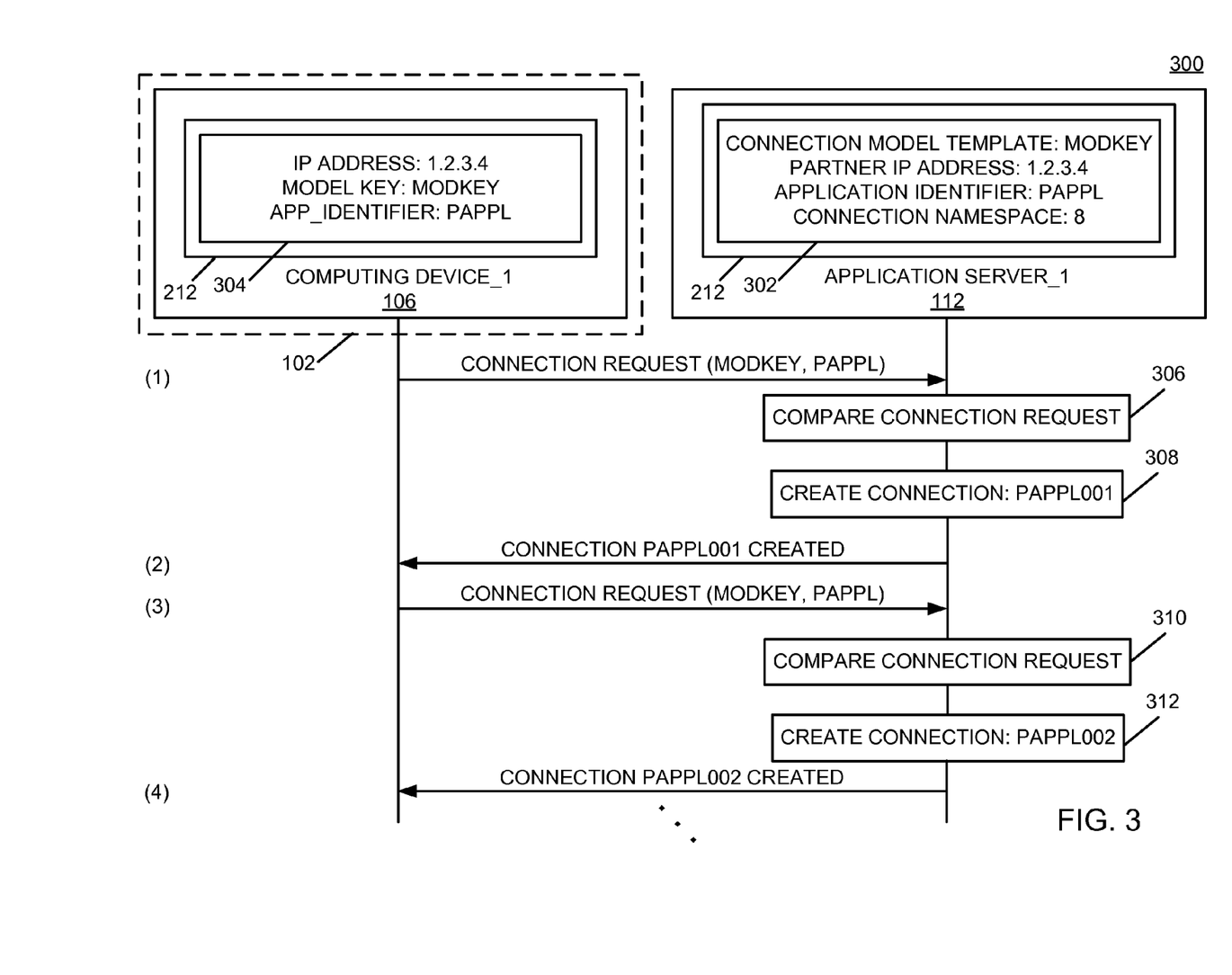
FIG. 3 is a message flow diagram of an example of an implementation of a message flow usable to perform connection model-based control of concurrent connection count and properties according to an embodiment of the present subject matter.

FIG. 3 is a message flow diagram of an example of an implementation of a message flow 300 usable to perform connection model-based control of concurrent connection count and properties. One of the computing device_1 106 (from one of the computing clusters 102 through 104) within the computing cluster 102 and the application server_1 112 are used for purposes of illustration within the message flow 300. It is understood that the present example applies to any cluster of computing devices that instantiate one or more partner systems/clones within a cluster, such as the computing cluster 102, and that interact to establish shared connections to a server, such as the application server_1 112. As described above, each computing device within a respective cluster may instantiate/execute one or more application client instances/clones that may each communicate via the network 110 to connect with the application server_1 112, as described herein.

Within the present example, a connection model 302 has been defined/configured with connection creation information within the connection model configuration area 212 of the application server_1 112 for use by the application server_1 112 to create connections as requested by partner system instances executed by the computing device_1 106. Similarly, a connection request model (e.g., connection factory) 304 has been defined/configured with connection request information within the connection model configuration area 212 of the computing device_1 106. The same models or similar models may be used by other computing devices and/or clusters as appropriate for a given implementation.

As can be seen within FIG. 3, the connection model 302 defined within the connection model configuration area 212 of the application server_1 112 includes four fields. The first field is a model connection template field with a configured value/name of "MODKEY." This model connection template field represents a model key that may be used by partner systems to request connections, as described above and in more detail below. The second field within the connection model 302 is a partner system Internet protocol (IP) address field with a value of "1.2.3.4." The third field is an application identifier field of "PAPPL." As such, partner system instances that attempt to connect to the application server_1 112 using an IP address of "1.2.3.4" and sending the model key "MODKEY" with an application identifier (ID) of "PAPPL" may be granted a connection to the application server_1 112 up to the maximum allowed/configured shared connections, as described above and in more detail below. The application server_1 112 may deny connection requests that come from different partner systems or from partner systems that use a different IP address. The fourth field within the connection model is a connection namespace field with a value of eight (8). This value indicates that the application server_1 112 is to utilize eight (8) character connection names to limit the number of connections. As described in more detail below, with an application identifier of "PAPPL," three (3) characters are available for connection numbers/names and the number of available connections may be limited using the natural namespace limitation provided by eight (8) characters.

As can also be seen within FIG. 3, the connection request model 304 defined within the connection model configuration area 212 of the computing device_1 106 also includes three fields. The first field is an Internet protocol (IP) address field with the same value of "1.2.3.4" as configured for the "MODKEY" connection model 302 defined in association with the application server_1 112. The second field is a model key field with a value that identifies the connection model key "MODKEY" of the connection model 302 defined in association with the application server_1 112. The third field is an application identifier field with a value of "PAPPL" that also matches the application identifier within the connection model 302 defined in association with the application server_1 112.

Because each of these fields defined within the connection request model 304 match the respective fields within the connection model 302 defined in association with the application server_1 112, the computing device_1 106, and in particular the partner applications instantiated by the computing device_1 106 with application ID "PAPPL" may be granted connections to the application server_1 112. Again, the connections may be limited by the connection namespace field limitation up to the configured connection limit, as described above in more detail below. It should be noted that other applications with different application identifiers or that utilize a different IP address or model key to request connections to the application server_1 112 will be refused by the application server unless the respective fields match a different connection model (omitted to avoid crowding within the drawing figure and for brevity within the present example).

For ease of description, an alphabetical model key and application (partner system) identifier are utilized within the message flow 300, and an alphanumeric connection name width of eight (8) characters is defined within the preconfigured model connection template represented by the connection model 302. For purposes of example, as described above, the application identifier is denoted within the present example as "PAPPL," which is a five (5) character alphabetic value that will be used to form connection names used by the computing devices 106 through 108 within the computing cluster 102. The application identifier is used to identify all instances of a particular partner system. Similarly, as described above, the model key is denoted within the present example as "MODKEY." The model key is used to identify predefined connection models/templates that are to be used by the respective partner systems to connect to a given application server.

It should be noted that the model key and application identifier may be any value(s) as appropriate for a given implementation and the examples described herein are not to be considered limiting. For example, hexadecimal, octal, or other numeric variations may be used to form the respective fields, either alone or in combination with alphabetical characters. Additionally, special characters may be used (e.g., "*," "&," "?," "-," "/," etc.) to further modify the examples described herein. Other variations on naming and namespace conventions are possible and all such variations are considered to be within the scope of the present subject matter.

Further, a numeric connection numbering scheme is utilized within the present example for ease of illustration purposes, though any form of naming connections may be utilized as appropriate for a given implementation. An alphanumeric naming convention for connections is used within the present example to illustrate naming convention-based connection limitations based upon the alphabetical application identifier and numeric connection numbering. However, it is understood that other forms of partner system/application identifiers may be utilized and all such forms are considered to be within the scope of the present subject matter.

Using the alphanumeric naming convention as an example, it is assumed that the connection model within the application server_1 112 has been defined with a fixed-length field width for connection names. To further the present example, with the connection namespace field defined within the connection model 302 and configured to a connection name width of eight (8) characters for connection names, partner systems with a five (5) character alphabetical partner/application identifier (e.g., PAPPL) may be limited to nine hundred and ninety nine (999) connections (e.g., omitting zero as a possible connection number). Using decimal-based numerals, the connection limit may be implemented within a three (3) character numeric field.

Using this example field width of five (5) characters for the alphabetical partner/application identifier width (e.g., "PAPPL"), each application client cluster/clone instance (e.g., executed by the computing device 106 through 108)

may be defined and used by the partner systems within this particular partner system cluster to connect to the application server_1 112. To request a connection to the application server, the partner systems pass the partner system identifier "PAPPL" and the model key "MODKEY" to the application server_1 112.

To limit connections, connection numbers may be numerically appended to the partner application identifier as connections are created to create connection names, within the present example utilizing the defined three-character numeric field. As such, again presuming that a connection number of zero (000) is not used/omitted, the first connection that is created may be named "PAAPL001." Similarly, the second connection that is created may be named "PAAPL002," up to the final allowed connection name "PAAPL999" for additional connections. Accordingly, using the example field width of eight (8) characters, nine hundred and ninety nine (999) connections may be named/established before a connection limitation is reached.

Continuing with the present example, a first partner system instance executed by the computing device_1 106 within the computing cluster 102 uses the connection factory information described above and issues a connection request to the application server_1 112 to request creation of a connection (line 1). The connection request includes the model key "MODKEY" and the application identifier "PAPPL" that are configured within the computing device_1 106 and that are shared by partner system instances within the computing cluster 102 for connection requests.

In response to receipt of the connection request, at block 306 the application server_1 112 compares the partner system identification details (e.g., PAPPL, IP address 1.2.3.4 from which the request was received, and the model key "MODKEY) to the connection model. If the partner system identification details match those defined in the connection model, the connection is accepted and a unique connection name may be generated based on the partner application identifier. Within the present example, the partner system identification details match the details defined in the connection model. The connection may be generated autonomously based upon the defined security mechanism at block 308. Within the present example, this is the first connection to be created for this cluster using the connection model and the created connection is named "PAPPL001."

As such, the application server_1 112 uses the received model key to match the request to its connection template named "MODKEY," validates the partner IP address and application ID, and then creates a unique connection named "PAPPL001" for this instance of the partner application. The application server_1 112 acknowledges creation of the connection named "PAPPL001" to the first partner system instance (line 2). This first instance of the partner application uses this connection named "PAPPL001" for all further communication requests with the application server_1 112.

Continuing with the present example, a second partner system instance executed by the computing device_1 106 within the computing cluster 102 also uses the connection factory to issue a connection request to the application server_1 112 to request creation of a connection (line 3). The connection request also includes the model key "MODKEY" and the application identifier "PAPPL" that are configured within the computing device_1 106 and that are shared by partner system instances within the computing cluster 102 for connection requests.

In response to receipt of the connection request, at block 310 the application server_1 112 compares the partner system identification details (e.g., PAPPL, IP address 1.2.3.4 from which the request was received, and the model key "MODKEY) to the connection model. If the partner system identification details match those defined in the connection model, the connection is accepted and a unique connection name may be generated based on the partner application identifier. Within the present example, the partner system identification details match the details defined in the connection model. The connection may be generated autonomously based upon the defined security mechanism at block 312. Within the present example, this is the second connection to be created for this cluster using the connection model and the created connection is named "PAPPL002."

As such, the application server_1 112 uses the received model key to match the request to its connection template named "MODKEY," validates the partner IP address and application ID, and then creates a unique connection named "PAPPL002" for this instance of the partner application. The application server_1 112 acknowledges creation of the connection named "PAPPL002" to the second partner system instance (line 4). This second instance of the partner application uses this connection named "PAPPL002" for all further communication requests with the application server_1 112.

The ellipsis dots at the bottom of FIG. 3 illustrate that the processing described above may continue for additional partner system instances and connections may be created to the configured maximum number of connections. Further, as described above, connections may also be terminated or released by partner system instances. As connections are terminated/released by partner system instances, the terminated/released connection names may be reused for connection requests from additional/other partner system instances, or for new connection requests from partner system instances that have previously released connections.

Given the example above, it may be seen that an increase of one character within the defined fixed-width connection name may increase the number of connections by a factor of ten (10). Similarly, a decrease of one character within the defined fixed-width connection name may decrease the number of connections by a factor of ten (10). Further, changing the number of characters used as partner system identifiers/model keys may be increased or decreased with similar effects. Additional variations in connection name width and partner system identifiers/model keys may be utilized to alter the automated connection limitation controls as appropriate for a given implementation. For example, counters and counter value limits or other technology may be utilized to control connection limits as appropriate for a given implementation, and all such variations are considered to be within the scope of the present technology.

Figure 4:
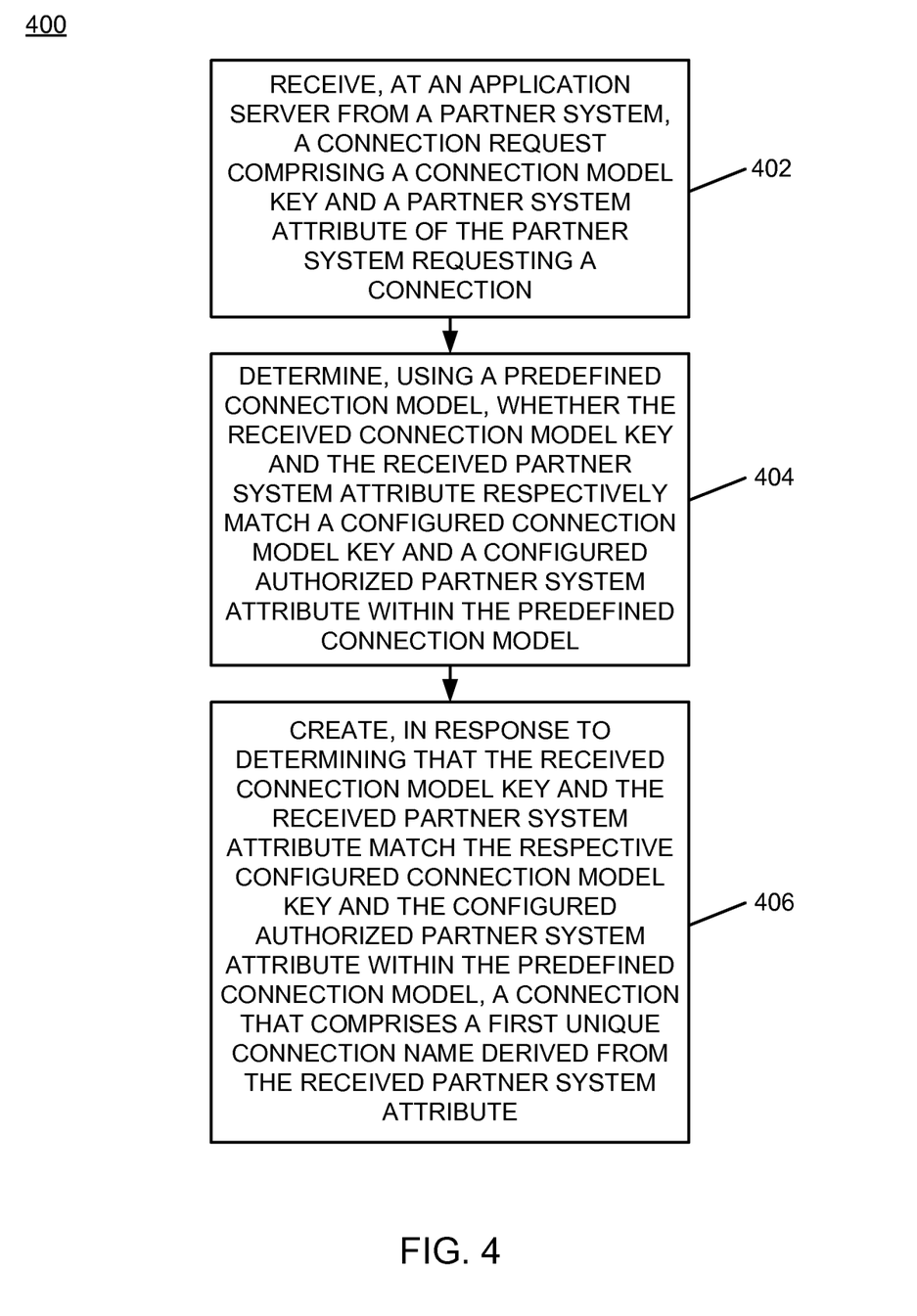
FIG. 4 is a flow chart of an example of an implementation of a process for connection model-based control of concurrent connection count and properties according to an embodiment of the present subject matter.
Figure 5:
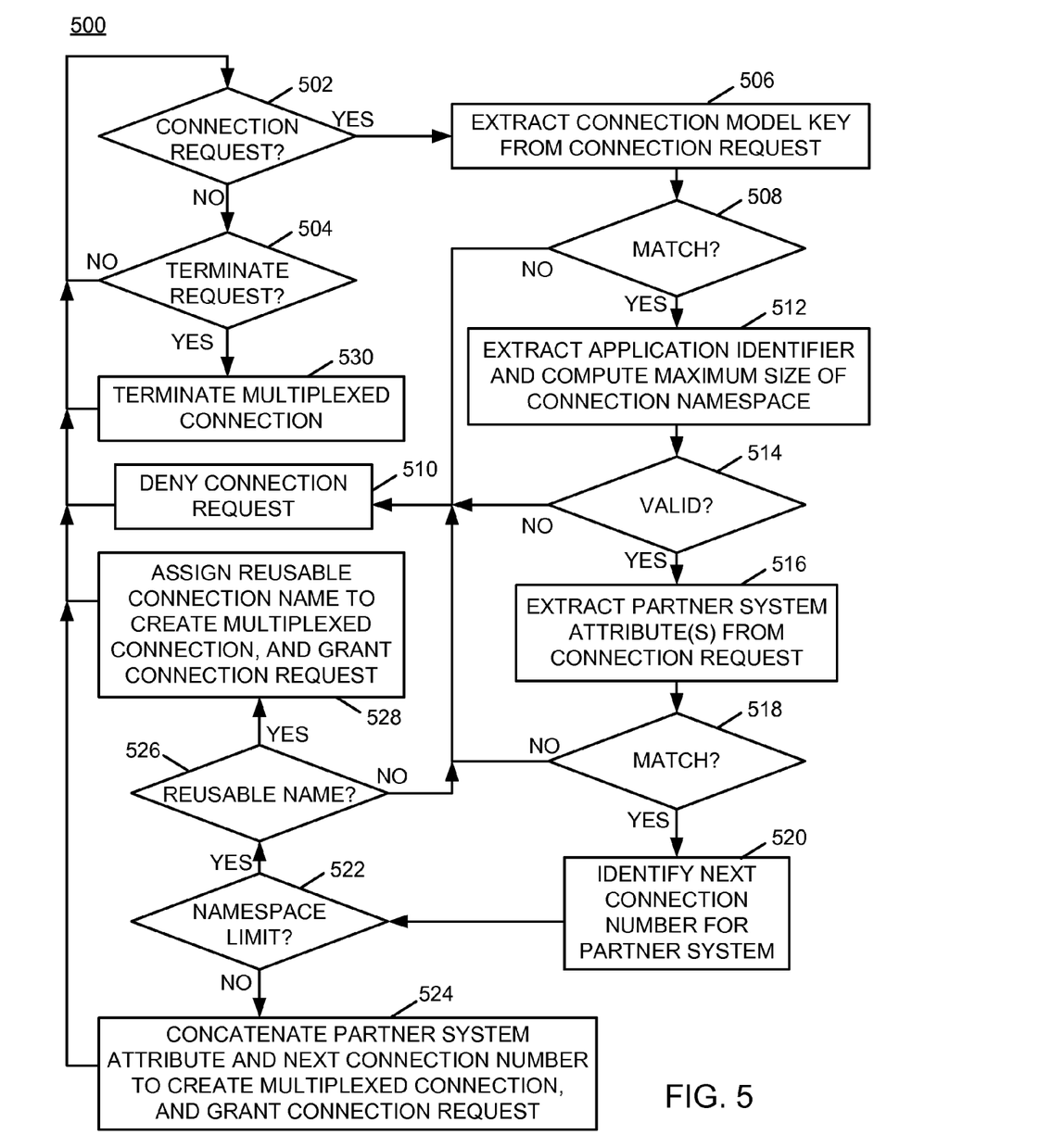
FIG. 5 is a flow chart of an example of an implementation of a process for connection model-based control of concurrent connection count and properties at an application server according to an embodiment of the present subject matter.

FIG. 4 through FIG. 5 described below represent example processes that may be executed by devices, such as the core processing module 200, to perform the automated connection model-based control of concurrent connection count and properties associated with the present subject matter. Many other variations on the example processes are possible and all are considered within the scope of the present subject matter. The example processes may be performed by modules, such as the connection control module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for connection model-based control of concurrent connection count and properties. At decision point 402, the process 400 receives, at an application server from a partner system, a connection request comprising a connection model key and a partner system attribute of the partner system requesting a connection. At block 404, the process 400 determines, using a predefined connection model, whether the received connection model key and the received partner system attribute respectively match a configured connection model key and a configured authorized partner system attribute within the predefined connection model. At block 406, the process 400 creates, in response to determining that the received connection model key and the received partner system attribute match the respective configured connection model key and the configured authorized partner system attribute within the predefined connection model, a connection that comprises a first unique connection name derived from the received partner system attribute.

FIG. 5 is a flow chart of an example of an implementation of a process 500 for connection model-based control of concurrent connection count and properties at an application server, such as one or more of the application server_1 112 through the application server_M 114. At decision point 502, as part of higher-level processing, the process 500 makes a determination as to whether a connection request has been received from a partner system/clone instance. In response to determining that a connection request has not been received from a partner system/clone instance, as an additional part of the higher-level processing, at decision point 504 the process 500 makes a determination as to whether a connection termination request has been received from a partner system/clone instance. In response to determining that a connection termination request has not been received from a partner system/clone instance, the process 500 returns to decision point 502 and iterates as described above. As such, the process 500 manages both connection requests and connection termination requests, as described in more detail below. Processing of connection termination requests will be described in detail further below, though it is understood that connection names for terminated connections may be reused by iterative processing of connection number request increments. Additionally, it is understood that a first of any such connection, while a logical connection with respect to the underlying physical connection, may be referred to as a "connection" without the "logical" modifier and that additional connections may be granted/installed as multiplexed logical connections with the first or other logical connection(s) over a single physical connection. As such, distinctions between logical and physical connections are captured by the description above and are omitted from the following drawing description for ease of description purposes.

Returning to the description of decision point 502, in response to determining that a connection request has been received from a partner system/clone instance, the process 500 extracts a connection model key from the connection request at block 506. At decision point 508, the process 500 makes a determination as to whether the received/extracted connection model key matches a configured connection model key defined within a defined connection model. For example, the process 500 may compare the received/extracted connection model key to configured connection model key(s) defined within one or more defined connection models that are configured for use by the process 500. In response to determining that the received/extracted connection model key does not match any configured connection model key defined within any defined connection model, the process 500 denies the connection request at block 510 and returns to decision point 502 and iterates as described above. As such, partner systems that do not provide an accurate/configured connection model key may be denied access to the application server executing the process 500.

Returning to the description of decision point 508, in response to determining that the received/extracted connection model key does match a configured connection model key defined within a defined connection model, the process 500 extracts the partner system application identifier from the connection request and computes the maximum size of the connection namespace (based upon the partner system application identifier) using a difference between the partner application identifier and a configured maximum width of connection names at block 512. At decision point 514, the process 500 makes a determination as to whether the partner system application identifier is valid (e.g., matches) for the matching connection model. In response to determining that the partner system application identifier is not valid for the matching connection model, the process 500 returns to block 510 to deny the connection and iterates as described above. In response to determining that the partner system application identifier is valid for the matching connection model, the process 500 extracts any additional partner system attribute(s) from the connection request at block 516. The additional partner system attributes may include, for example, a partner system cluster identifier, and/or any other attribute appropriate for a given implementation. At decision point 518, the process 500 makes a determination as to whether the received/extracted additional partner system attribute(s) match any configured additional authorized partner system attribute(s) configured within the matching connection model. For example, the process 500 may compare the received/extracted additional partner system attribute(s) to authorized partner system attribute(s) configured within the matching connection model. In response to determining that the received/extracted additional partner system attribute(s) do not match the authorized partner system attribute configured within the matching connection model, the process 500 returns to block 510 to deny the connection request and iterates as described above. As such, the process 500 enforces connection authorization of connections to the application server using the configured authorized partner system attributes within the connection model.

Returning to the description of decision point 518, in response to determining that the received/extracted additional partner system attribute(s) do match the additional authorized partner system attribute(s) configured within the matching connection model, the process 500 identifies a next connection number for the partner system cluster at block 520. The next connection number may be identified, for example, by retrieving and incrementing the last connection number that was created in association with a connection name (e.g., from a cache). The last connection number may be incremented in response to a new request or as part of completion of creation of a connection, as appropriate for a given implementation. Additionally, when the configured maximum is reached, the connection number may be incremented from the configured maximum back to one (1) and iterate as connections are requested. Additionally, the respective connection number may be retrieved from a register/variable that is incremented for connection numbering, or otherwise as appropriate for a given implementation.

It is understood that the extraction of both the connection model key and the partner system attribute may be performed contemporaneously along with a contemporaneous comparison of the respective values to configured connection model values. Additional variations on the processing described herein are possible and all are considered to be within the scope of the present technology.

At decision point 522, the process 500 makes a determination as to whether a connection namespace limitation has been reached in view of the incremented connection number. As described above, the connection model may include a connection namespace field limitation that limits a number of created unique connection names. The connection name may include both the partner system identifier and the multiplexed connection number (again as noted above, a logical connection number). As such, a field width limitation for connection numbering within a connection name may be used to autonomously limit the number of connections for a given partner system cluster. As such, an overflow of the respective field width (e.g., a wrap to zero or a negative number) may be utilized to determine that the connection limitation has been reached. Additionally, as described above, initially a check may be performed to determine whether the count of the maximum available namespace has been exceeded. If the count of the maximum available namespace has been exceeded, then the connection request may be denied. If count of the maximum available namespace has not been exceeded, a/the previous connection number may be retrieved (e.g., from a cache, register, variable, or otherwise). The previous connection number may be incremented, or if at the numeric limit, the connection number may be reset to the first connection number (e.g., reset to one (1)).

In response to determining at decision point 522 that the connection namespace limitation has not been reached in view of the incremented connection number, the process 500 concatenates the partner system attribute (e.g., identifier) with the incremented connection number to create a multiplexed connection, and grants the connection request at block 524. As such, the process 500 creates a multiplexed connection name (again, a logical connection name) that incorporates the partner system attribute and the connection-limited connection number. Accordingly, each partner system instance utilizes a unique connection name for multiplexed application accesses to the application server. The process 500 returns to decision point 502 and iterates as described above.

Returning to the description of decision point 522, in response to determining that the connection namespace limitation has been reached in view of the incremented connection number, the process 500 makes a determination at decision point 526 as to whether a reusable connection name is available. For example, if the resulting connection name from the increment operation described above is not available, the process 500 may iterate as described above until an available connection name is identified/validated or until a determination is made that no connection name is available (this iteration is not illustrated to avoid crowding within the drawing space).

In response to determining that a reusable connection name is not available at decision point 526, the process 500 returns to block 510 to deny the connection request and iterates as described above. As such, the process 500 enforces a limit on a number of multiplexed connections to the application server from partner systems that share the partner system attribute using the connection namespace field limitation within the connection model. The process 500 further denies additional connection requests in response to determining, based upon the namespace field limitation that limits the number of created unique connection names and the previously-created connection names, that the limit on the number of multiplexed connections to the application server from partner systems that share the partner system attribute has been reached.

Returning to the description of decision point 526, in response to determining that a reusable connection name is available, when the first available connection name is identified, the new connection may be installed/granted using this derived name (e.g., partner application identifier concatenated with the numeric suffix). The process 500 assigns the reusable connection name to create a multiplexed connection for the requesting partner system instance and grants the connection request at block 528. As such, the process 500 may reuse a unique connection name for a new multiplexed connection in response to a new connection that includes the appropriate connection model key and that share the same partner system attribute assigned to the respective partner system cluster. As such, the process 500 also enforces a limit on a number of multiplexed connections to the application server from partner systems that share the partner system attribute using the connection namespace field limitation within the connection model by reusing connection names. The process 500 returns to decision point 502 and iterates as described above.

Returning to the description of decision point 504, in response to determining that a connection termination request has been received from a partner system/clone instance, the process 500 terminates the multiplexed connection to the partner system that is requesting the termination of the multiplexed connection at block 530. The reusable connection names may be utilized, as described above, to enforce the limit on the number of multiplexed connections to the application server from partner systems that share the partner system attribute. The process 500 returns to decision point 502 and iterates as described above.

As such, the process 500 processes connection and termination requests at an application server to manage and control which partner system instances may connect to the server, and the number of partner system instances that may connect concurrently. As additional connection requests that include the connection model key are received from additional partner systems that share the same partner system attribute, the process 500 enforces the limit on the number of multiplexed connections to the application server from partner systems that share the partner system attribute using the connection namespace field limitation within the connection model. For such additional requests, the process 500 determines whether the limit on the number of multiplexed connections to the application server from partner systems that share the partner system attribute has been reached based upon the namespace field limitation that limits the number of created unique connection names and based upon previously-created connection names. The process 500 creates additional multiplexed connections over the connection that includes, for each connection, an additional unique connection name derived from the received partner system attribute and based upon previously-created connection names for use by the additional requesting partner system. As such, the connection model authorizes multiple specific partner system instances to connect using the same connection model via the partner system attribute, and provides control over the number of concurrently-connected partner systems. Accordingly, the process 500 manages impacts on resource availability, access, security, and other issues to an application server.

As described above in association with FIG. 1 through FIG. 5, the example systems and processes provide connection model-based control of concurrent connection count and properties. Many other variations and additional activities associated with connection model-based control of concurrent connection count and properties are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
by an application server that self-regulates creation of new shared logical connections operative over a single physical connection within a distributed system:
receiving, from a partner system, a connection request comprising a connection model key and a partner system attribute of the partner system requesting a connection;
determining, using a predefined connection model, whether the received connection model key and the received partner system attribute respectively match a configured connection model key and a configured authorized partner system attribute within the predefined connection model, where the predefined connection model comprises a connection namespace field limitation that limits a number of created unique connection names;
creating a logical connection over the single physical connection that comprises a first unique connection name derived from the received partner system attribute, where creating the logical connection is in response to determining that the received connection model key and the received partner system attribute match the respective configured connection model key and the configured authorized partner system attribute within the predefined connection model;
receiving additional connection requests comprising the connection model key from additional partner systems that share the partner system attribute; and
enforcing a limit on a number of multiplexed logical connections to the application server over the single physical connection from partner systems that share the partner system attribute using the connection namespace field limitation within the predefined connection model, comprising:
for each additional connection request:
creating, in response to determining that the limit on the number of multiplexed logical connections has not been reached based upon the connection namespace field limitation that limits the number of created unique connection names and based upon previously-created connection names, an additional multiplexed logical connection over the single physical connection that comprises an additional unique connection name derived from the received partner system attribute and based upon the previously-created connection names.

2. The method of claim 1, where creating the logical connection over the single physical connection that comprises the first unique connection name derived from the received partner system attribute comprises the application server:
concatenating the received partner system attribute and a next available connection number to form the first unique connection name.

3. The method of claim 1, further comprising the application server denying at least one additional connection request in response to determining, based upon the connection namespace field limitation that limits the number of created unique connection names and the previously-created connection names, that the limit on the number of multiplexed logical connections to the application server over the single physical connection from the partner systems that share the partner system attribute has been reached.

4. The method of claim 1, further comprising the application server:
receiving a request to terminate a multiplexed logical connection from one of the additional partner systems;
terminating the multiplexed logical connection to the one of the additional partner systems requesting the termination of the multiplexed logical connection; and
reusing the additional unique connection name used by the terminated multiplexed logical connection for a new multiplexed logical connection in response to a new connection request comprising the connection model key and the partner system attribute.

5. The method of claim 1, where:
the predefined connection model authorizes a plurality of specific partner system instances to connect concurrently over the single physical connection using the predefined connection model via the partner system attribute; and
further comprising the application server enforcing connection authorization of the multiplexed logical connections to the application server over the single physical connection using the configured authorized partner system attribute within the predefined connection model.

6. The method of claim 1, where the partner system attribute comprises a partner system cluster application instance identifier.

7. A system, comprising:
a memory; and
a processor of an application server that self-regulates creation of new shared logical connections operative over a single physical connection within a distributed system, the processor programmed to:
receive, from a partner system, a connection request comprising a connection model key and a partner system attribute of the partner system requesting a connection;
determine, using a predefined connection model stored within the memory, whether the received connection model key and the received partner system attribute respectively match a configured connection model key and a configured authorized partner system attribute within the predefined connection model, where the predefined connection model comprises a connection namespace field limitation that limits a number of created unique connection names;
create a logical connection over the single physical connection that comprises a first unique connection name derived from the received partner system attribute, where the processor being programmed to create the logical connection is in response to the processor determining that the received connection model key and the received partner system attribute match the respective configured connection model key and the configured authorized partner system attribute within the predefined connection model;
receive additional connection requests comprising the connection model key from additional partner systems that share the partner system attribute; and
enforce a limit on a number of multiplexed logical connections to the application server over the single physical connection from partner systems that share the partner system attribute using the connection namespace field limitation within the predefined connection model, comprising the processor being programmed to:
for each additional connection request:
create, in response to determining that the limit on the number of multiplexed logical connections has not been reached based upon the connection namespace field limitation that limits the number of created unique connection names and based upon previously-created connection names, an additional multiplexed logical connection over the single physical connection that comprises an additional unique connection name derived from the received partner system attribute and based upon the previously-created connection names.

8. The system of claim 7, where in being programmed to create the logical connection over the single physical connection that comprises the first unique connection name derived from the received partner system attribute, the processor is programmed to:
concatenate the received partner system attribute and a next available connection number to form the first unique connection name.

9. The system of claim 7, where:
the predefined connection model authorizes a plurality of specific partner system instances to connect concurrently over the single physical connection using the predefined connection model via the partner system attribute; and
the processor is further programmed to enforce connection authorization of the multiplexed logical connections to the application server over the single physical connection using the configured authorized partner system attribute within the predefined connection model.

10. The system of claim 7, where the partner system attribute comprises a partner system cluster application instance identifier.

11. The system of claim 7, where the processor is further programmed to deny at least one additional connection request in response to determining, based upon the connection namespace field limitation that limits the number of created unique connection names and the previously-created connection names, that the limit on the number of multiplexed logical connections to the application server over the single physical connection from the partner systems that share the partner system attribute has been reached.

12. The system of claim 7, where the processor is further programmed to:
receive a request to terminate a multiplexed logical connection from one of the additional partner systems;
terminate the multiplexed logical connection to the one of the additional partner systems requesting the termination of the multiplexed logical connection; and
reuse the additional unique connection name used by the terminated multiplexed logical connection for a new multiplexed logical connection in response to a new connection request comprising the connection model key and the partner system attribute.

13. A computer program product, comprising:
a computer readable storage device having computer readable program code embodied therewith, where the computer readable program code when executed on a computer implemented as an application server that self-regulates creation of new shared logical connections operative over a single physical connection within a distributed system causes the computer to:
receive, from a partner system, a connection request comprising a connection model key and a partner system attribute of the partner system requesting a connection;
determine, using a predefined connection model, whether the received connection model key and the received partner system attribute respectively match a configured connection model key and a configured authorized partner system attribute within the predefined connection model, where the predefined connection model comprises a connection namespace field limitation that limits a number of created unique connection names;
create a logical connection over the single physical connection that comprises a first unique connection name derived from the received partner system attribute, where causing the computer to create the logical connection is in response to the computer determining that the received connection model key and the received partner system attribute match the respective configured connection model key and the configured authorized partner system attribute within the predefined connection model;

receive additional connection requests comprising the connection model key from additional partner systems that share the partner system attribute; and enforce a limit on a number of multiplexed logical connections to the application server over the single physical connection from partner systems that share the partner system attribute using the connection namespace field limitation within the predefined connection model, comprising the computer readable program code when executed on the computer causing the computer to:

for each additional connection request:
create, in response to determining that the limit on the number of multiplexed logical connections has not been reached based upon the connection namespace field limitation that limits the number of created unique connection names and based upon previously-created connection names, an additional multiplexed logical connection over the single physical connection that comprises an additional unique connection name derived from the received partner system attribute and based upon the previously-created connection names.

14. The computer program product of claim 13, where in causing the computer to create the logical connection over the single physical connection that comprises the first unique connection name derived from the received partner system attribute, the computer readable program code when executed on the computer causes the computer to:

concatenate the received partner system attribute and a next available connection number to form the first unique connection name.

15. The computer program product of claim 13, where:
the predefined connection model authorizes a plurality of specific partner system instances to connect concurrently over the single physical connection using the predefined connection model via the partner system attribute; and the computer readable program code when executed on the computer further causes the computer to enforce connection authorization of the multiplexed logical connections to the application server over the single physical connection using the configured authorized partner system attribute within the predefined connection model.

16. The computer program product of claim 13, where the partner system attribute comprises a partner system cluster application instance identifier.

17. The computer program product of claim 13, where the computer readable program code when executed on the computer further causes the computer to deny at least one additional connection request in response to determining, based upon the connection namespace field limitation that limits the number of created unique connection names and the previously-created connection names, that the limit on the number of multiplexed logical connections to the application server over the single physical connection from the partner systems that share the partner system attribute has been reached.

18. The computer program product of claim 13, where the computer readable program code when executed on the computer further causes the computer to:

receive a request to terminate a multiplexed logical connection from one of the additional partner systems;

terminate the multiplexed logical connection to the one of the additional partner systems requesting the termination of the multiplexed logical connection; and reuse the additional unique connection name used by the terminated multiplexed logical connection for a new multiplexed logical connection in response to a new connection request comprising the connection model key and the partner system attribute.

* * * * *